United States Patent [19]

Bergman

[11] 4,258,866
[45] Mar. 31, 1981

[54] DISPENSER ACTUATING CHUCK ADAPTER

[76] Inventor: Carl P. Bergman, 2316 NE. 5th Ave., Lighthouse Point, Fla. 33064

[21] Appl. No.: 15,304

[22] Filed: Feb. 26, 1979

Related U.S. Application Data

[63] Continuation of Ser. No. 811,886, Jun. 20, 1977, abandoned.

[51] Int. Cl.³ .............................................. B67D 5/46
[52] U.S. Cl. .................................... 222/333; 222/390
[58] Field of Search ........................... 222/326–327, 222/333, 390; 403/287, 301, 334, 361; 64/30 R, 10; 279/1 A

[56] References Cited

U.S. PATENT DOCUMENTS

| | | | |
|---|---|---|---|
| 2,696,940 | 12/1954 | Andresen | 64/30 R X |
| 2,743,637 | 5/1956 | Redmon | 64/30 R X |
| 3,156,387 | 11/1964 | Harwood | 222/390 |
| 3,279,835 | 10/1966 | Krohm | 403/361 X |
| 3,599,765 | 8/1971 | Turner et al. | 279/1 A X |
| 3,709,534 | 1/1973 | Coe | 403/361 X |
| 3,774,816 | 11/1973 | Bratton | 222/391 |
| 3,984,033 | 10/1976 | Groth et al. | 222/390 X |
| 3,985,273 | 10/1976 | Davis, Jr. | 222/326 |

*Primary Examiner*—Charles A. Marmor
*Attorney, Agent, or Firm*—Cushman, Darby & Cushman

[57] ABSTRACT

The chuck of an electric drill mounts an annular collar which may be fitted to the rotary actuator of a twist top dispenser cartridge for caulking or the like. As the drill is operated, the chuck rotates the collar which turns the rotary actuator thus dispensing the cartridge contents. By preference, the adapter of which the collar is a part incorporates a clutch which permits the user to initiate and terminate dispensing, without releasing the trigger of the electric drill, by manipulating the cartridge relative to the electric drill.

4 Claims, 3 Drawing Figures

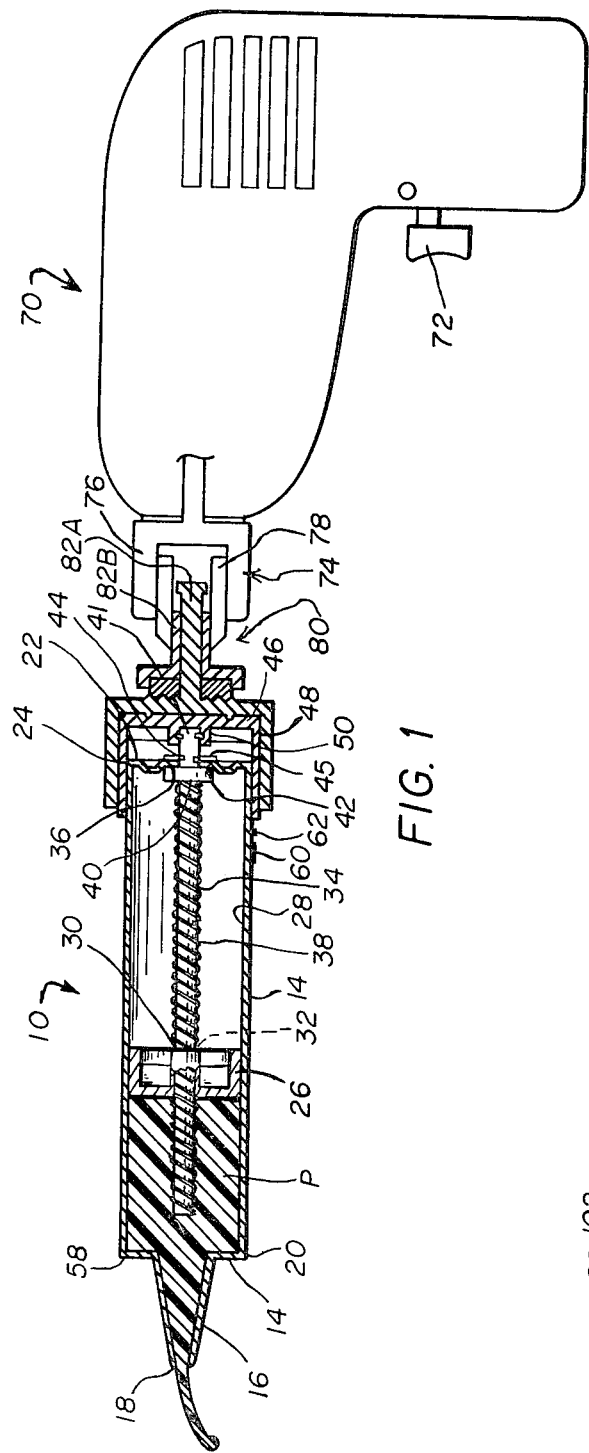
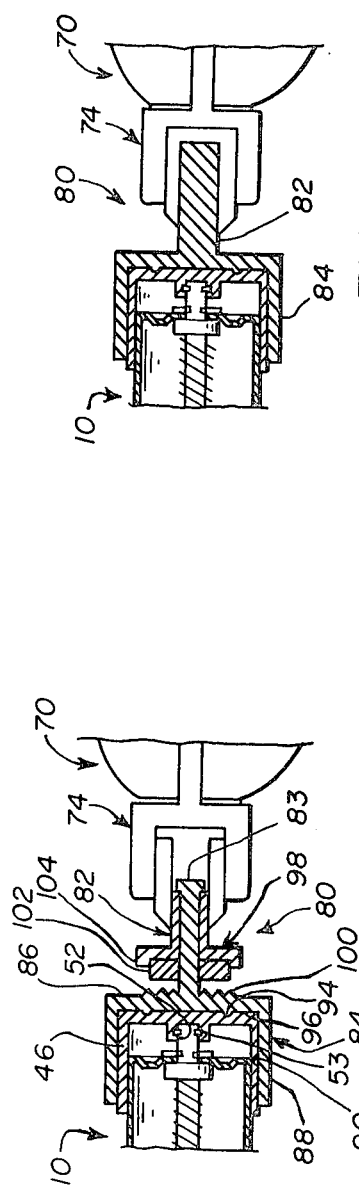
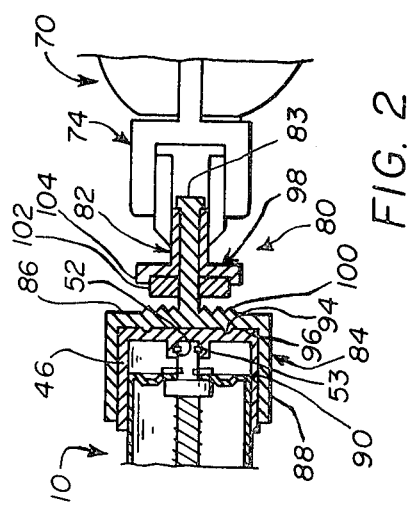

DISPENSER ACTUATING CHUCK ADAPTER

This is a continuation of application Ser. No. 811,886, filed June 20, 1977 (now abandoned).

BACKGROUND OF THE INVENTION

The copending U.S. Patent Application of the present inventor, Ser. No. 683,238, filed May 4, 1976 (now abandoned in favor of a continuation-in-part application Ser. No. 825,393, filed Aug. 17, 1977, now U.S. Pat. No. 4,144,988, issued Mar. 20, 1979) discloses a twist-top dispenser for caulking and the like, in which a standard caulking cartridge or the like is, during its manufacture, provided with a cap on its rear end which, when rotated, advances the piston within the cartridge to expel a bead of flowable plastic contents from the dispenser tip at the forward end of the cartridge. That dispenser was developed to permit users to apply such contents from cartridges without the need for a caulking gun.

SUMMARY OF THE INVENTION

It now develops that those twist-top dispensers are eminently suited for use in a related market, and the present invention provides a means by which such dispensers may be readily used therein.

Moderate to high volume users of cartridges of flowable plastic compounds are likely to be professional installers of paneling, dry wall, bathroom tile and tubs, house painters (for caulking), glaziers, house renovators, roofers (for caulking) and the like. Many of these artisans already have electric drills for driving screws, dry wall screws and the like. Adapters are in wide use to permit electric drills to be used for cutting circular holes (e.g., for installing lock hardware in doors), for stirring paint, for grinding, sanding and buffing and for other purposes.

Accordingly, it is believed that an adapter to permit twist top dispenser cartridges to be operated by electric drills is wanted and will be welcomed and widely used in the building trades and elsewhere, and contribute to the success of twist top dispenser cartridges.

In practicing the invention the chuck of an electric drill mounts an annular collar which may be fitted to the rotary actuator of a twist top dispenser cartridge for caulking or the like. As the drill is operated, the chuck rotates the collar which turns the rotary actuator thus dispensing the cartridge contents. By preference, the adapter of which the collar is a part incorporates a clutch which permits the user to initiate and terminate dispensing, without releasing the trigger of the electric drill, by manipulating the cartridge relative to the electric drill.

The principles of the invention will be further discussed with reference to the drawing wherein preferred embodiments are shown. The specifics illustrated in the drawing is intended to exemplify, rather than limit, aspects of the invention as defined in the claims.

BRIEF DESCRIPTION OF THE DRAWING

FIG. 1 is a side elevational view, partly in longitudinal section, of an electric drill coupled to a twist top dispenser cartridge via an adapter provided in accordance with principles of the present invention;

FIG. 2 is a fragmentary longitudinal sectional view thereof with the clutch of the adapter disengaged; and FIG. 3 is a fragmentary longitudinal sectional view of a simpler version of the adapter, interposed between an electric drill and a twist top dispenser cartridge.

DETAILED DESCRIPTION OF THE PRESENTLY PREFERRED EMBODIMENTS

The Dispenser

The twist-top dispenser 10, includes a tubular body 12 with a forward end wall 14 having an axially, forwardly projecting dispenser spout 16, generally one whose tip 18 must first be clipped off before material can be dispensed. As an example, the tube 12 may be a spiral-wound foil/fiber composite. The end 14 may be made of metal and crimped in place at 20 and the spout 16 may be made of injection-molded polyethylene. In fact, the elements 12-20 described so far may be identical to those presently widely in use for the dispenser cartridges that are presently used with conventional cradle type, trigger advanced piston-type caulking guns.

However, the dispenser 10 tubular body 12 has a second end wall 22 secured at its opposite end. By preference, the end wall 22 is an annular, disk-shaped member that is crimped in place at 24, using a standard metal end/foil fiber can end crimping machine.

Within the tube 12, there is slidingly received a piston 26 of such a large diameter that it substantially radially fills the cross sectin of the lumen 28 of the tube.

The piston 26 has a central bore 30 that is internally threaded all along its length, at 32. An externally, helically threaded rod 34 is coaxially received in the tube lumen 28 and extends from near the dispenser-equipped end 14, along the length of the tube and out through an opening 36 centrally placed in the opposite end wall 22. The helical threading 38 on the rod 34 extends therealong nearly to where the rod an integral, washer-shaped enlargement 40 formed coaxially thereon to provide a combined bearing and seal between the rod 34 and the inside of the end 22 circumferentially of the opening 36. The end 22 is concentrically provided with a shallow circular depression 42 into which the enlargement 40 is recessed. The outer peripheral surface of the depression is generally frustoconically tapered, to circumferentially slidingly engage and tend to support and center the axially outer face and radially outer periphery of the enlargement 40. Axially beyond the axially outer face of the enlargement 40 by a distance equal to the thickness of the end 22, the rod 34 is provided with a circumferentially extending, radially outwardly opening, axially short groove 44 which accepts a snap ring 45 to retain the rod 34 assembled to the end 22 for relative rotation therebetween. Beyond the groove 44, the rod 34 has a non-circular, e.g., square sectional end portion 41.

A twist top 46 is provided, having an outer peripheral surface 48 that is grooved or knurled for easier gripping.

In its underside, the twist top 46 is provided with a boss 50 with a non-circular e.g., square-sectioned socket 52. The non-circular socket 52 fits with and receives the projection 41 on the rod 34. In the example shown, a bead and groove set 53 respectively in the socket 52 and on the end portion 41 snap together upon insertion of the projection 41 into the socket 52 for securing the twist top 46 on the rod 34.

By preference, the rod 34 threading is very low pitch, square profile threading and the threading inside the piston is complementary. Accordingly, as the top 46 is twisted, the rod 34 is rotated and the piston axially advances without rotating. This is due to the light frictional engagement of the piston with the tube wall, the viscous nature of the tube contents acting on the piston face in contacting with the tube contents and the low pitch of the threading. Accordingly, in practice, no extra means need be provided to restrain the piston against rotation.

The forward end of the rod 34 may project into the dispenser spout a short way to provide a bearing, but that is not necessary if the rod is stiff and securely mounted at its twist top carrying end.

The shoulder 42 is preferably integrally molded of plastic material with the rod 34.

It should be apparent that when the lumen 28, forwardly of the piston, if filled with a viscous plastic product P, and the piston, rod, shoulder, bearing and seal member 42, end 22 and twist cap are assembled, inserted as shown and the outer edge of the end 22 crimped to the tube end at 58, the product may be easily dispensed by snipping off the tip of the dispenser spout and twisting the twist top to advance the piston. Arrow means 60 may be provided for indicating the angular sense the twist top is to be twisted for dispensing and tick marks 62 may be provided to give the user a sense of the volume of product being dispensed. For instance, a user applying adhesive to two parts which are to be joined, may wish to apply one fourth of a full twist's worth of adhesive to each part, and may easily do so by observation of the tick marks. The whole article 10 may be simply disposed of when its supply of product P is exhausted.

The Electric Drill

The electric drill 70 is wholly conventional, although it is preferred that it be of the continuously variable speed type, or at least have a range of selectible speeds which includes a low speed. It may be either of the type which has an electric power cord which is plugged into an electrical outlet, or of the battery operated, cordless type. In any event, the electric drill 70 includes an on-off switch 72, preferably of the squeezable trigger type, which, when squeezed causes a motor contained in the drill 70 to rotate its chuck 74. The typical chuck 74 includes a rotatable ring 76 surrounding a plurality of jaws 78 set in a circular array. The ring may be manually rotated relative to the group of jaws 78 in order to expand and contract the array of jaws, to release or grip any shaft which may be inserted axially centrally of the array of jaws 78. Once the ring 76 is tightened with such a shaft in place, and the trigger 72 is squeezed, the ring 76, jaws 78 and that shaft rotate together as a unit.

The Adapter

In accordance with the principles of the invention, the shaft just mentioned is the base of an adapter 80.

The adapter 80 includes a shaft 82 which coaxially mounts an axially forwardly opening cup 84. The cup 84 includes a disk shaped rear wall 86, with a tubular collar or skirt 88 projecting coaxially forwardly from the radially outer periphery thereof. Simply stated, the cup 84 has a forwardly presented recess 90 and is sized and shaped to snugly, axially, removably receive the twist top 46 of the dispenser 10. There is provided between the mutually engaging surface means 92 of the recess 90 and of the twist top 46 interengaging connection means 94 for rotationally driving the twist top 46 from the adapter 80 when the cup 84 is rotated by the shaft 82.

The interengaging connection means 94 may take many forms, such as splines in the twist top skirt means 48 and cup skirt 88, and/or corresponding protuberences and detents (shown) in the twist top 46 end wall 47 and cup rear wall 86. In some instances a sufficiently tight fit can be accomplished by tapering the skirt 48 and/or 88 to provide an easy entrance, but an interference fit once the twist top is bottomed in the cup 84. Further, the connection means may include a disk 96 of abrasive material such as sand paper secured, by epoxy resin or the like, to the cup rear wall 86 and/or a circumferential band of such material likewise secured to the skirt 88 inside the cup.

The embodiment of FIGS. 1 and 2 further includes a clutch means 98 which permits the cup 84 to be engaged with and disengaged from the shaft 82. Thus, a user of this embodiment may assemble the adapter 80 to the drill and insert a cartridge twist top first into the cup 84 and begin to dispense by squeezing the drill switch trigger. However, as an alternative to releasing the drill switch trigger to cease dispensing temporarily, the user may simply axially retract the drill slightly from the cartridge, thus disengaging the clutch means 98.

Although the clutch means 98 may be of any conventional sort, it is shown having the following form: The shaft 82 is divided into two coaxial portions, a radially inner core 82A that is rigidly secured to the cup, and a tubular radially outer sleeve 82B, in which the core is received for relative rotational movement and for relative axial movement, limited by a boss 83. The boss 83 prevents the core from being withdrawn from the sleeve, yet permits sufficient axial relative movement to permit the plates 100, 102 of the clutch means 98 to engage and to disengage. As shown, the clutch plate 100 is provided by a knurled exterior face on the cup 84 surrounding the base of the shaft core 82A and the clutch plate 102 is provided by an annular high friction surfaced flange 104 radiating from the forward end of the shaft sleeve 82B.

The embodiment shown in FIG. 3 is virtually identical to the embodiment shown in FIGS. 1 and 2, except for being more easily and cheaply made, by virtue of omitting the clutch means 98.

It should be apparent that the invention will work with twistable actuator dispensers of other designs than the one shown, and to dispense other products than caulking, ranging from panel adhesive, fast patching plaster mix, to decorative cake frosting and the like.

It should now be apparent that the Dispenser Actuating Chuck Adapter as described hereinabove, possesses each of the attributes set forth in the specification under the heading "Summary of the Invention" hereinbefore. Because the Dispenser Actuating Chuck Adapter can be modified to some extent without departing from the principles of the invention as they have been outlined and explained in this specification, the present invention should be understood as encompassing all such modifications as are within the spirit and scope of the following claims.

What is claimed is:
1. For interposition between
   (a) a rotary power tool having a chuck for gripping a shaft to be rotated and a switch means for actuating the rotary power tool to rotate the chuck; and
   (b) a tubular container of viscous plastic material, having a dispenser spout at one end, having a rota- tionally twistable actuator at the opposite end, and having a piston means therewithin which is advanced by twisting said actuator, for dispensing said viscous plastic material from said spout;

(c) an adapter, comprising:

a forwardly open cup and a shaft mounted to extend coaxially, exteriorly from the rear of said cup for securement in said annular chuck, said cup being sized and shaped to receive said twistable actuator and having surface means therein for interconnecting the cup and the twistable actuator for corotation, and said shaft being couplable to the cup, so that when the shaft is secured in the chuck and the chuck is rotated, such rotation is transmissible from the chuck to the rotary actuator via coupling of the shaft and the cup;

clutch means interposed between the shaft and the cup engageable for rotating the cup from the shaft and disengageable for permitting rotation of the shaft without producing corresponding rotation of the cup;

said clutch means comprising:

a division of said shaft into a central core secured to the cup and a surrounding sleeve, means for accommodating limited axial relative movement of the core and sleeve; a first clutch plate provided on the exterior of the cup circumferentially surrounding said core and a second clutch plate in the form of an annular collar secured on said sleeve, so that in a first axial position of said core relative to said sleeve the first clutch plate is in driven contacting relation with said second clutch plate and so that in a second axial position of said core relative to said sleeve the first clutch plate is out of driven contacting relation with said second clutch plate.

2. The adapter of claim 1, wherein the cup includes a disk-shaped rear and a forwardly projecting outer peripheral skirt, and said surface means including pin means projecting axially forwardly at a plurality of eccentric sites within the cup on the disk-shaped rear thereof.

3. In combination:

(a) a rotary power tool having a chuck for gripping a shaft to be rotated and a switch means for actuating the drill to rotate the chuck;

(b) a tubular container of viscous plastic material, having a dispenser spout at one end, having a rotationally twistable actuator at the opposite end, and having a piston means therewithin which is advanced by twisting said actuator, for dispensing said viscous plastic material from said spout; and (c) an adapter comprising:

a forwardly open cup and a shaft mounted to extend coaxially, exteriorly from the rear of said cup, said cup receiving said twistable actuator and having surface means therein interconnecting the cup and the twistable actuator for corotation, and said shaft being couplable to the cup, so that when the shaft is secured in the chuck and the chuck is rotated, such rotation is transmissible from the chuck to the rotary actuator via coupling of the shaft and the cup;

clutch means interposed between the shaft and the cup engageable for rotating the cup from the shaft and disengageable for permitting rotation of the shaft without producing corresponding rotation of the cup, said clutch means comprising:

a division of said shaft into a central core secured to the cup and a surrounding sleeve, means for accommodating limited axial relative movement of the core and sleeve; a first clutch plate provided on the exterior of the cup circumferentially surrounding said core and a second clutch plate in the form of an annular collar secured on said sleeve, so that in a first axial position of said core relative to said sleeve the first clutch plate is in driven contacting relation with said second clutch plate and so that in a second axial position of said core relative to said sleeve the first clutch plate is out of driven contacting relation with said second clutch plate.

4. A power-dispensable caulking set, so that a power-operated device having an axially forwardly presented annular chuck may be used for dispensing caulking, said caulking set comprising:

(a) a tubular container of viscous plastic material, having a dispenser spout at one end, having a rotationally twistable actuator at the opposite end, and having a piston means therewithin which is advanced by twisting said actuator, for dispensing said viscous plastic material from said spout; and (b) an adapter, comprising:

a forwardly open cup and a shaft mounted to extend coaxially, exteriorly from the rear of said cup for securement in said annular chuck, said cup receiving said twistable actuator and having surface means therein interconnecting the cup and the twistable actuator for corotation, and said shaft being couplable to the cup, so that when the shaft is secured in the chuck and the chuck is rotated, such rotation is transmissible from the chuck to the rotary actuator via coupling of the shaft and the cup;

clutch means interposed between the shaft and the cup engageable for rotating the cup from the shaft and disengageable for permitting rotation of the shaft without producing corresponding rotation of the cup, said clutch means comprising:

a division of said shaft into a central core secured to the cup and a surrounding sleeve, means for accommodating limited axial relative movement of the core and sleeve; a first clutch plate provided on the exterior of the cup circumferentially surrounding said core and a second clutch plate in the form of an annular collar secured on said sleeve, so that in a first axial position of said core relative to said sleeve the first clutch plate is in driven contacting relation with said second clutch plate and so that in a second axial position of said core relative to said sleeve the first clutch plate is out of driven contacting relation with said second clutch plate.

* * * * *